US012123252B2

(12) United States Patent
Lee

(10) Patent No.: US 12,123,252 B2
(45) Date of Patent: Oct. 22, 2024

(54) THERMAL INSULATION STRUCTURE IN SIDE SECTION IN WHICH TWO-SIDE SUPPORTING FRAME WINDOW SASH OVERLAPS DOOR FRAME IN SLIDING WINDOW SYSTEM

(71) Applicant: FILOBE CO., LTD., Gyeongsan-si (KR)

(72) Inventor: Kwang-Seog Lee, Daegu (KR)

(73) Assignee: FILOBE CO., LTD., Gyeongsan-si (KR)

( * ) Notice: Subject to any disclaimer, the term of this patent is extended or adjusted under 35 U.S.C. 154(b) by 148 days.

(21) Appl. No.: 17/635,910

(22) PCT Filed: Aug. 20, 2019

(86) PCT No.: PCT/KR2019/010601
§ 371 (c)(1),
(2) Date: Feb. 17, 2022

(87) PCT Pub. No.: WO2021/033798
PCT Pub. Date: Feb. 25, 2021

(65) Prior Publication Data

US 2022/0282559 A1 Sep. 8, 2022

(51) Int. Cl.

*E06B 3/36* (2006.01)
*E06B 3/26* (2006.01)
*E06B 3/263* (2006.01)
*E06B 3/273* (2006.01)

(52) U.S. Cl.

CPC ............ *E06B 3/26347* (2013.01); *E06B 3/26* (2013.01); *E06B 3/2735* (2013.01); *E06B 2003/26378* (2013.01)

(58) Field of Classification Search

CPC ...... E06B 3/26; E06B 3/2632; E06B 3/26341; E06B 3/26347; E06B 3/4609; E06B 3/4618; E06B 3/26301; E06B 2003/2615; E06B 2003/26321; E06B 2003/26327; E06B 2003/26332; E06B 2003/26378
See application file for complete search history.

(56) References Cited

U.S. PATENT DOCUMENTS 2,798,578 A * 7/1957 Toth .................... E06B 3/26347 49/495.1
4,554,770 A * 11/1985 Anders ............... E06B 3/26347 49/458
4,569,170 A * 2/1986 Gartner ................. E06B 1/6007 52/235
5,379,824 A * 1/1995 Carvalho .............. E06B 3/2605 160/90

(Continued)

*Primary Examiner* — Kyle J. Walraed-Sullivan
(74) *Attorney, Agent, or Firm* — Reichel Stohry Dean LLP; Mark C. Reichel; Natalie J. Dean

(57) ABSTRACT

The present invention relates to a thermal insulation structure of a door frame in which a moving window (sliding window) constituting a sliding window system is installed, and more particularly, a two-side supporting frame window supporting both sides of a glass window constituting a sliding window system, more particularly, relates to an insulating structure in a side section of a door frame into which the side portion of the sliding window that is moved when closing the sliding window of the supporting frame window type is pocketed, that is, the insulating structure of the side section of the door frame.

4 Claims, 23 Drawing Sheets

(56) References Cited

U.S. PATENT DOCUMENTS

| | | | | |
|---|---|---|---|---|
| 5,446,997 | A * | 9/1995 | Simonton | E06B 3/44<br>49/458 |
| 2010/0192468 | A1* | 8/2010 | Chubb | E06B 7/2312<br>49/404 |
| 2016/0130859 | A1* | 5/2016 | Takada | E06B 3/66<br>52/202 |
| 2017/0298620 | A1* | 10/2017 | Yu | E06B 3/26338 |
| 2019/0203522 | A1* | 7/2019 | Machado Rainha | E05B 65/08 |
| 2020/0109595 | A1* | 4/2020 | Woodward | E06B 3/26303 |
| 2020/0263421 | A1* | 8/2020 | Yu | E04B 2/967 |
| 2021/0207425 | A1* | 7/2021 | Lee | E06B 3/2605 |
| 2021/0388665 | A1* | 12/2021 | Zimmermann | E06B 3/26 |

* cited by examiner

- Prior Art -

- Prior Art -

[ a-a' section ]

- Prior Art -

- Prior Art -

- Prior Art -

- Prior Art -

[ a-a' section ]

- Prior Art -

[ b-b' section : open ]

- Prior Art -

[ b-b' section : closed ]

- Prior Art -

[ a-a' section ]

- Prior Art -

- Prior Art -

[ b-b' section : closed ]

- Prior Art -

[ a-a' section ]

- Prior Art -

[ b-b' section : open ]

- Prior Art -

THERMAL INSULATION STRUCTURE IN SIDE SECTION IN WHICH TWO-SIDE SUPPORTING FRAME WINDOW SASH OVERLAPS DOOR FRAME IN SLIDING WINDOW SYSTEM

TECHNICAL FIELD

The present invention relates to a heat insulation (thermal insulation) structure of a door frame in which a moving window (sliding window) constituting a sliding window system is installed. More specifically, it relates to a heat insulation structure in the side section of a door frame into which the side of a sliding window is moved and inserted in a pocket type when closing the sliding window of a two-side supporting frame window type supporting both sides of the glass window constituting the sliding window.

BACKGROUND ART

In general, when a sliding window (moving window) and a fixed window of four-side supporting frame window type that support the four sides of the glass window with thick supporting frames as a movable window (sliding window) and a fixed window constituting a sliding window system are used (FIG. 1*a*), as shown in a-a' cross-sectional view (longitudinal cross-sectional view) of FIG. 1*b*, the sliding window system has a structure in which a roller slides along a roller guide rail on a door frame (chassis frame) 1 by providing the roller installed on a lower part of a window chassis 2*a* in which a glass is fitted. However, in case of such a four-side supporting frame window type, in order to sufficiently support the weak rigidity of the glass window, as shown in the a-a' longitudinal sectional view of FIG. 1*b* and the b-b' cross-sectional view of FIGS. 1*c* & 1*d*, an aluminum (AL) frame, a material with very high thermal conductivity, is installed on all four sides around the window. Therefore, there was no great difficulty in achieving good thermal insulating function.

Recently, however, in the case of pair glasses produced for construction and supplied to the market, its rigidity has improved to such an extent that there is no need to place a separate aluminum window chassis member on the lower or upper part, and the demand for a window system with a slimmer window chassis frame is increasing under the influence of modern architectural design that emphasizes the wide openness of windows. To reflect this trend and provide good heating and cooling energy efficiency, the use of a sliding window of a two-side support frame window type (see FIG. 2) in which aluminum supporting frames are installed only on both sides of a glass window is increasing so as to minimize the use of the aluminum chassis, which is a material with high thermal conductivity As shown as an example of the Swiss Company of Sky-Frame ® product in FIGS. 3*a* to 3*c*, as an example of a window system having a sliding window of such a two-side support frame window type, the window chassis 2*b* made of an aluminum (AL) material into which the glass 2*g* is sandwiched, exists only on both sides of the glass 2*g*, but there is no aluminum chassis other than a synthetic resin glass support insulation bracket 2*gb* (a member that wraps around the glass end for the purpose of preventing breakage and cushioning and insulation, and is made of organic materials such as polyamide or P.V.C.) at the upper part and the lower part of the glass 2*g*. In this case, so that the synthetic resin glass support insulation bracket 2*gb* attached to the side of the glass 2*g* can support it more strongly from the side, a side cap 2*b*1 made of aluminum metal having relatively excellent fixing support force despite a thin thickness is additionally provided as a window chassis. Among the aluminum metal side caps 2*b*1, the aluminum metal side cap 2*b*1 on the side section of the door frame 1 (the left parts of FIGS. 3*b* and 3*c*), which is a part in contact with the outside air, is formed with inner side and outer side separated to improve thermal insulation performance, and a heat insulating member 2*b*2 is inserted between the inner side and outer side of the aluminum metal side cap 2*b*1.

However, when the sliding window 2 is closed, even if the window chassis 2*b* made of aluminum (AL), the side of which is inserted into an insertion pocket 1*v* on the door frame 1 side, is separated by the heat insulating member 2*b*2, a lot of heat is lost from the in-side portion of the aluminum metal side cap 2*b*1 to the out-side portion of the door frame 1 and the aluminum metal side cap 2*b*1 in contact with low-temperature outdoor air due to convection of air existing in the insertion pocket 1*v*. As a result, the temperature of the in-side portion of the aluminum metal side cap 2*b*1 is lowered, and consequently, energy efficiency is lowered. Furthermore, despite the high indoor temperature, the side cap 2*b*1 of the window chassis 2*b* made of an aluminum (AL) material has a low surface temperature, thereby exhibiting a problem in that dew condensation occurs.

On the other hand, as a means for avoiding such a problem, when the sliding window 2 is closed, the use of an aluminum material is avoided in the side part inserted into the insertion pocket 1*v* on the door frame 1 side, and the aluminum metal side cap 2*b*1 part is removed. A new side cap 2*b*1 may have the same configuration as in the example of Schueco's product in Germany in which the portion of the synthetic resin (PL; Plastic) or carbon fiber (CF; Carbon Fiber) insulating material is formed as the side cap 2*b*1. Nevertheless, it also cannot prevent heat loss due to convection of air present in the insertion pocket 1*v*, as well as the synthetic resin or carbon fiber side cap 2*b*1 alone, in an environment where strong wind acts on the glass, it is difficult to properly control the excessive deformation occurring in the glass support insulation bracket 2*gb*, there is a problem of exposing structural weaknesses.

Technical Problem

The present invention is to solve the common problems of the prior art described above. In a sliding window system having a two-side supporting frame window sash that supports only both sides of a glass window constituting a sliding window, it is a technical problem of the present invention to provide a specially improved structure not only for securing a better glass panel fixing function by constructing a narrow window chassis 2*b* that exists only on both sides of the glass 2*g* with using an aluminum material having sufficient rigidity and durability, but also for achieving a better insulation function by blocking heat transfer due to convection or conduction in the insertion pocket formed on the side section of the door frame in the side section where the two-side supporting frame window chassis and the door frame are overlapping on each other, as much as possible.

Technical Solution

In order to solve the above-described technical problem, the present invention provides an insulating structure in which a side chassis part of a two-side supporting frame window chassis and a door frame in a side section are overlapping on each other, when a sliding window is closed in a two-side supporting frame window type sliding window system that supports only both sides of the glass window constituting the sliding window, wherein the insulating structure provide a supporting structure in which a roller is directly coupled to a lower glass supporting insulation bracket made of a flexible material without an aluminum chassis under the glass panel so that the roller slides along a guide rail on the door frame, and wherein the insulating structure provide a foamed insert member for blocking thermal bridge in an insertion pocket of the door frame into which the side cap made of aluminum of the side chassis portion of the sliding window is inserted when a sliding window comprising a glass support insulation bracket attached to the side of the glass panel; and a side chassis portion having a side cap made of an aluminum material provided to support the glass support insulation bracket from the inner and outer surfaces, is sliding and is closing into a door frame, wherein the foamed insert member for blocking thermal bridge is fixedly installed in a longitudinal direction on an inner part of the door frame with filling a gap space between the inner part of the door frame and the side cap made of an aluminum material of the side chassis portion of the sliding window, and wherein a rubber gasket is installed in a longitudinal direction on an outer surface of the foamed insert member for blocking thermal bridge in order to provide airtightness between the side caps made of aluminum and the foamed insert member for blocking thermal bridge.

Here, in the insulating structure in which a side chassis part of a two-side supporting frame window chassis and a door frame in a side section are overlapping on each other, when a sliding window is closed in a two-side supporting frame window type sliding window system that supports only both sides of the glass window constituting the sliding window, the foamed insert member for blocking thermal bridge is formed to have a '⊂' shape (a channel shape with one inner side open) so that can fill all of a front surface, a side surface, and a back surface of the insertion pocket of the door frame.

Meanwhile, in the insulating structure, the foamed insert member for blocking thermal bridge is formed by integrally molding a foamed plastic-based heat insulating material that can have both heat insulation properties and shape retention properties.

Advantageous Effects

According to the insulating structure in the sliding window system of the two-side supporting frame window type to which the present invention is applied, in the side section where the two-side supporting frame window chassis and the door frame overlap each other when the sliding window is closed, by minimizing heat transfer due to conduction or convection that may occur inside the insertion pocket by filling the gap space in the insertion pocket between the inner side of the door frame and the aluminum side cap of the side chassis portion of the sliding window with the foamed insert member for blocking thermal bridge with excellent thermal insulation performance, it provides the effect of maximizing energy efficiency and preventing condensation.

In the sliding window system employing the structure according to the present invention, by making it possible to use a side cap made of an aluminum material having relatively high rigidity and durability in the side chassis of the sliding window, the insulation structure has a more stable control force against the displacement or deformation of the glass panel support bracket (glass support insulation bracket made of flexible material) generated by wind pressure.

In addition, it provides the effect of ensuring good thermal insulation performance through the foamed insert member for blocking thermal bridge with excellent thermal insulation performance that fills the gap space in the insertion pocket between the inner side of the door frame and the aluminum side cap of the side chassis portion of the sliding window.

MODES OF THE INVENTION

Hereinafter, embodiments that are easily performed by those skilled in the art will be described in detail with reference to the accompanying drawings. However, the embodiments of the present invention may be achieved in several different forms and are not limited to the embodiments described herein.

Figure 1A:
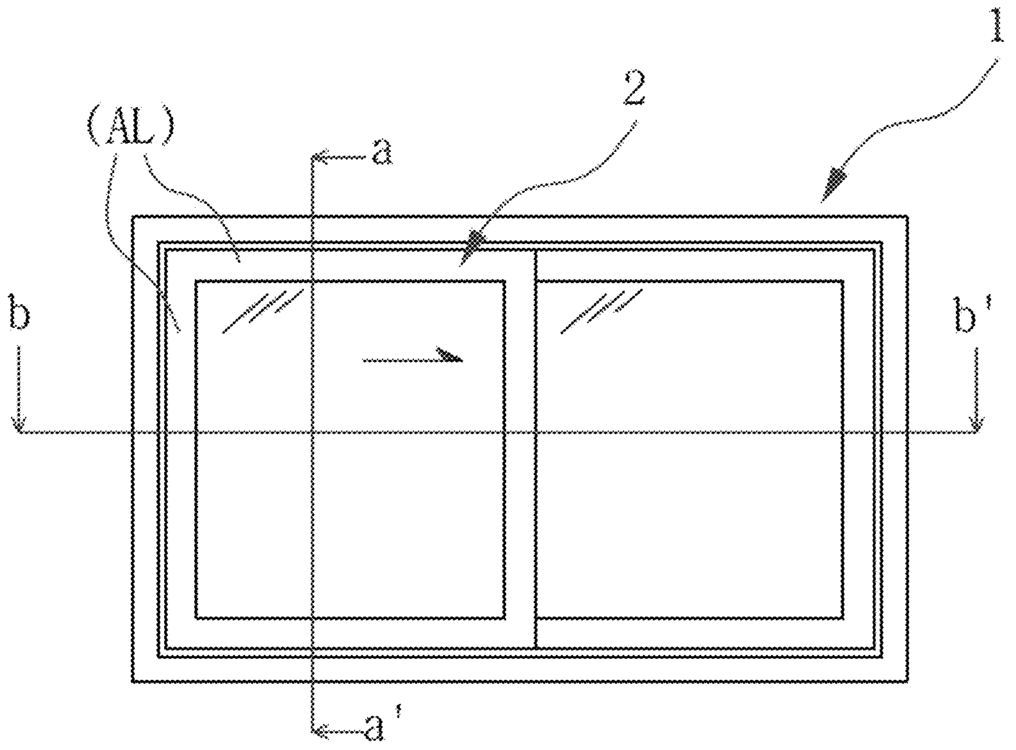
FIGS. 1*a* to 1*d* are views showing a conventional general sliding window system, showing a sliding window having a window chassis supporting glass at four sides.
Figure 1B:
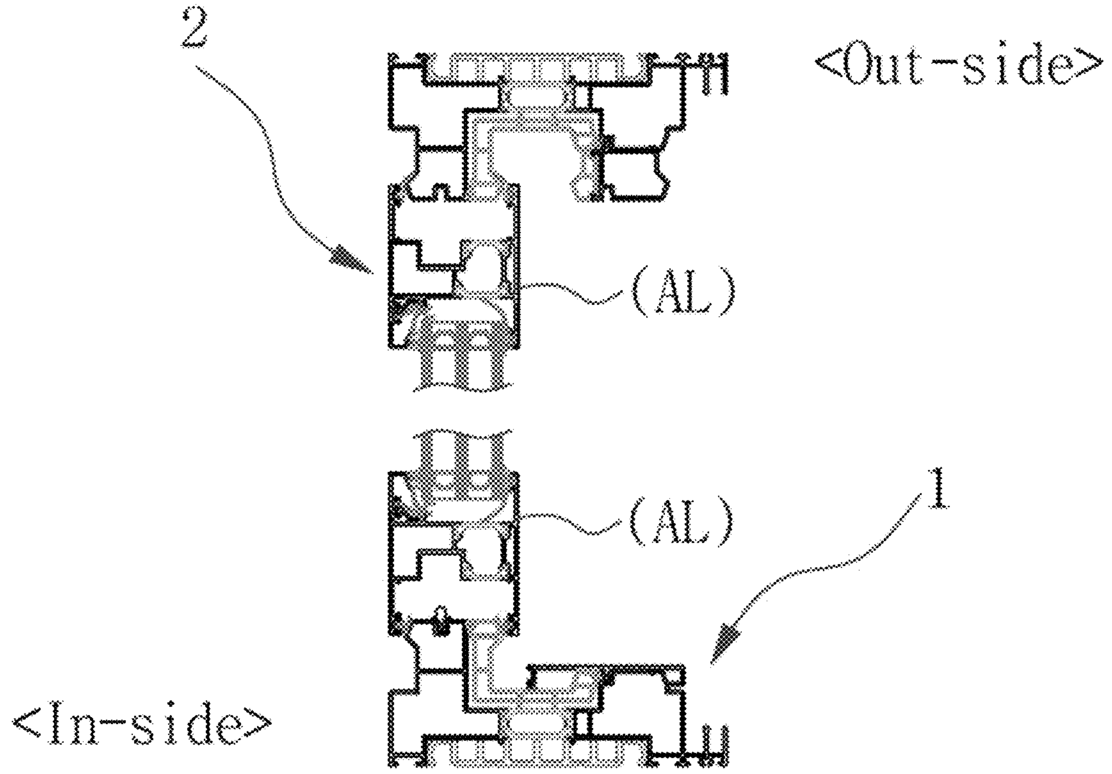
Figure 1C:
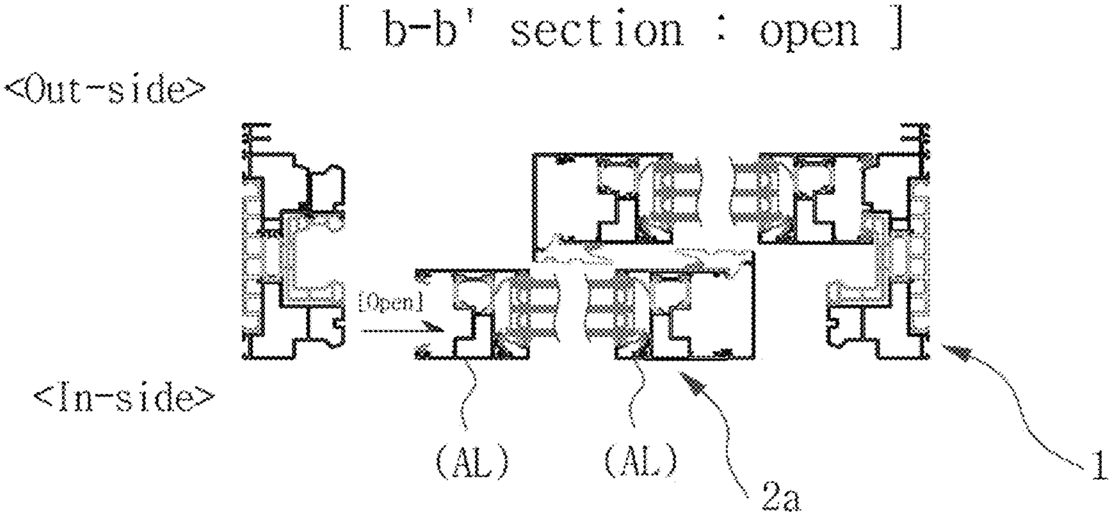
Figure 1D:
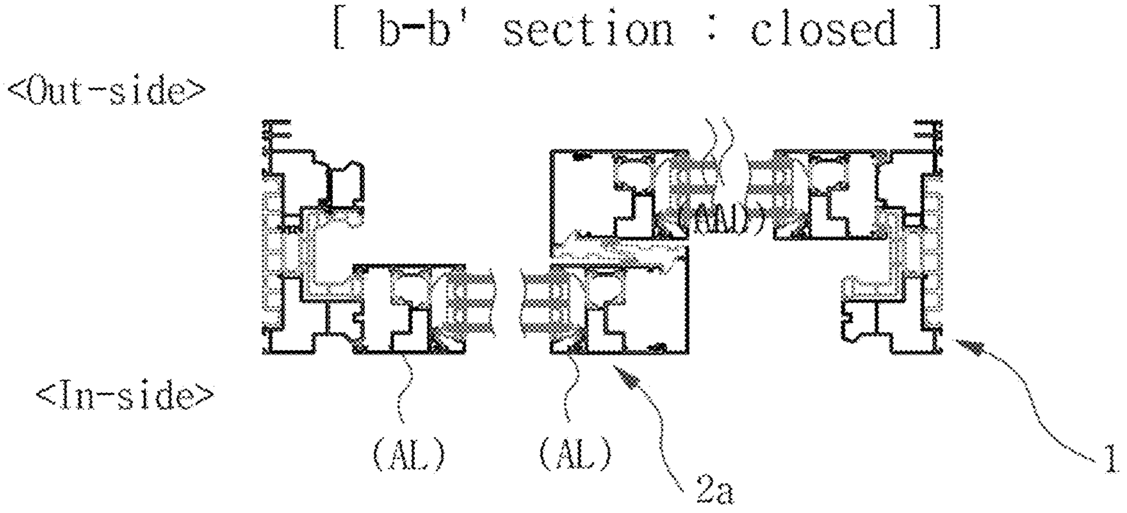
Figure 2:
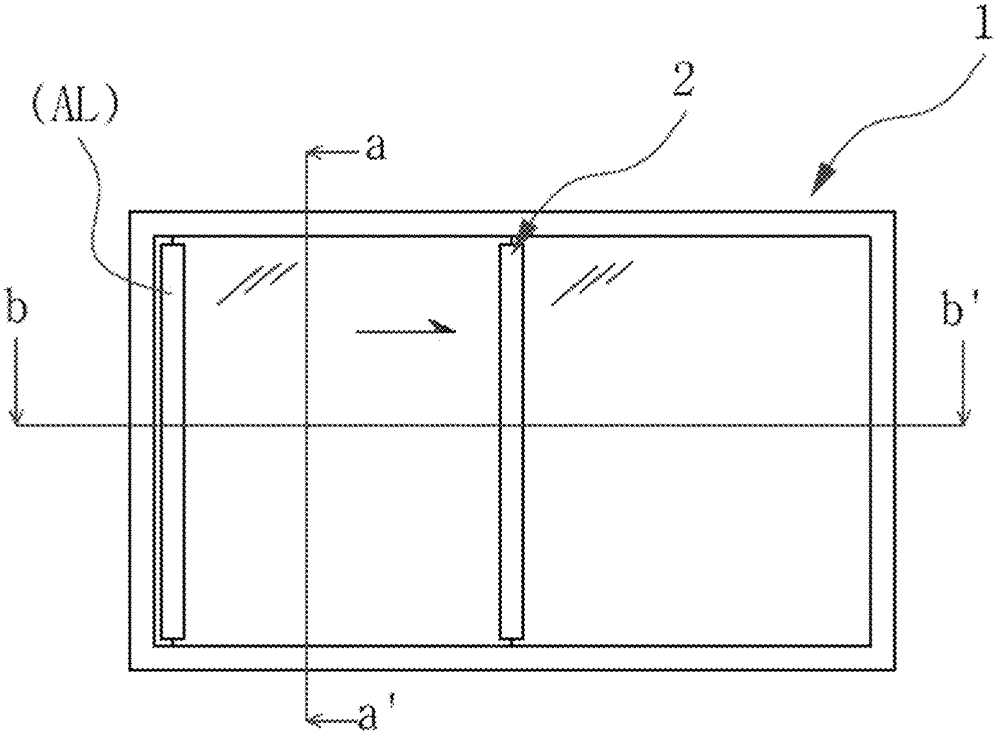
FIG. 2 and FIGS. 3*a* to 3*c* are views showing sliding windows improved from the general sliding window system shown in FIGS. 1*a* to 1*d*, and the openness of the windows is emphasized in this improvement. Theses drawings are a schematic view showing an example of a sliding window installation structure in which the two-side supporting frame supports only both sides of the glass panels constituting the sliding windows (two-side supporting windows type) and glass is directly placed on the upper part of the roller without an aluminum window chassis under the lower part of the sliding window.
Figure 3A:
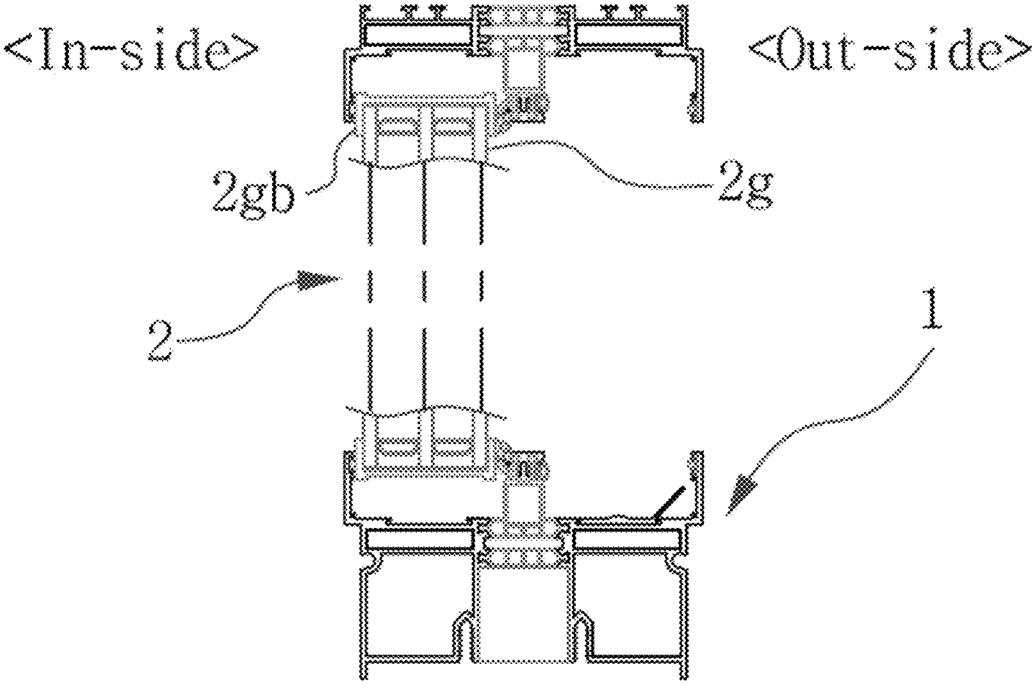
Figure 3B:
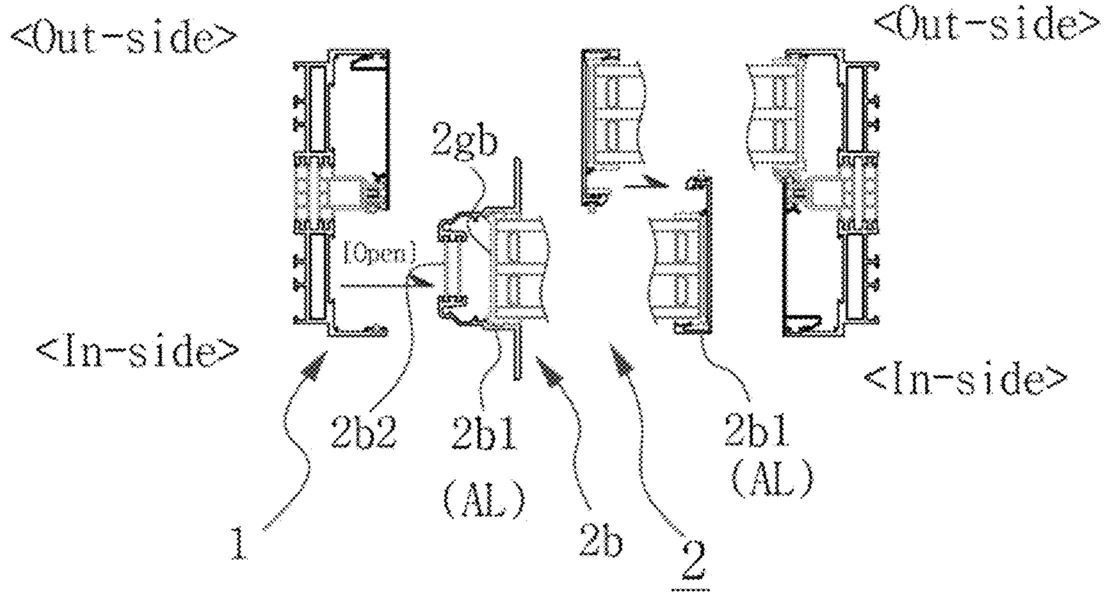
Figure 3C:
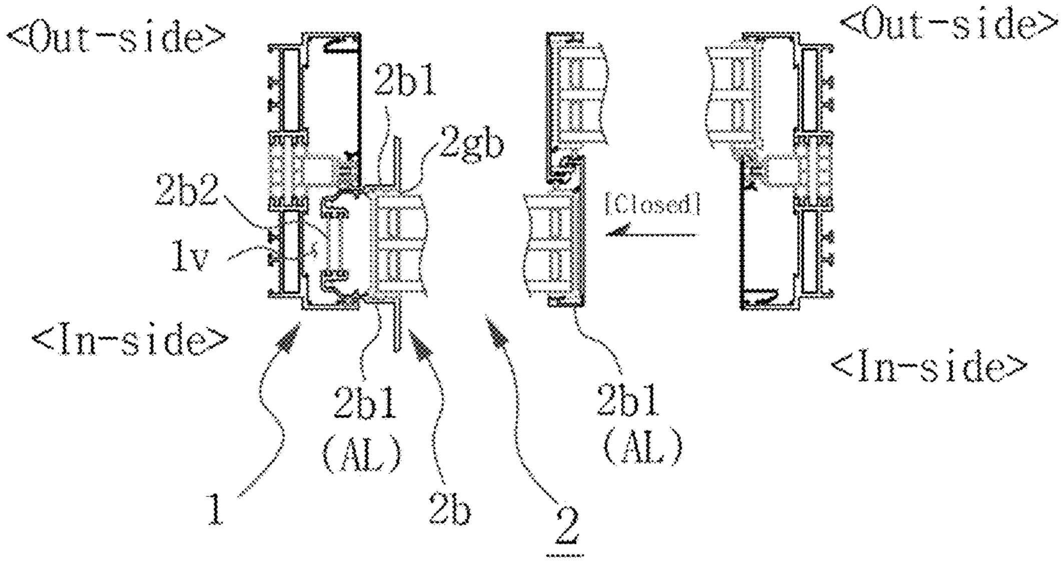
Figure 4A:
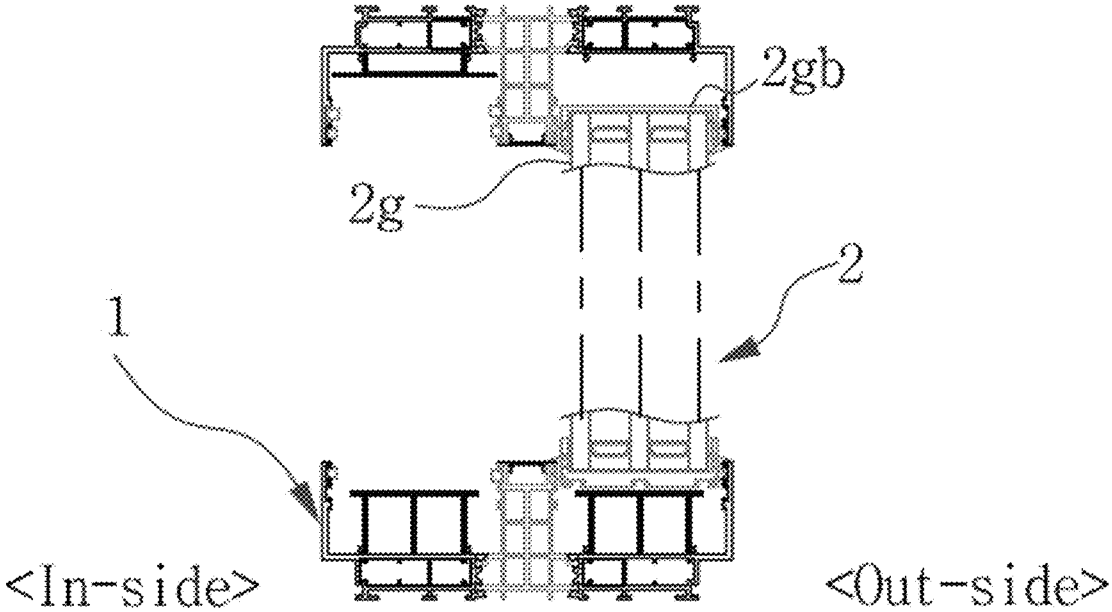
FIGS. 4*a* to 4*c* are views showing another example of a sliding window of a two-side supporting frame window type.
Figure 4B:
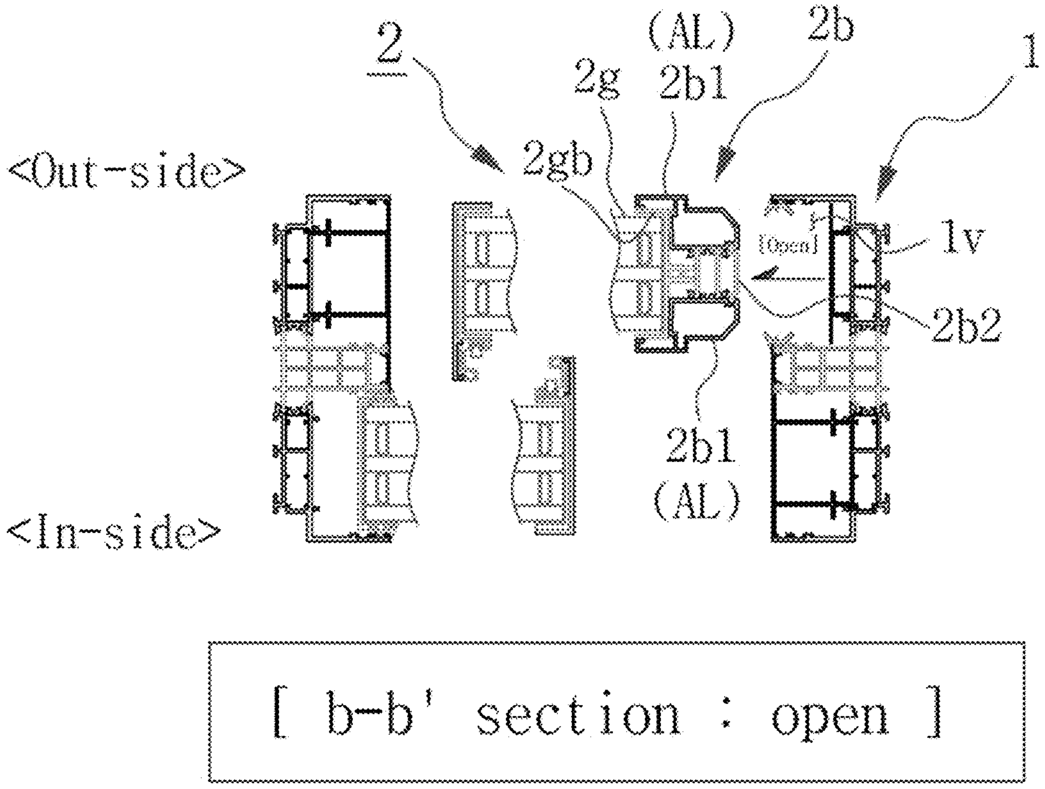
Figure 4C:
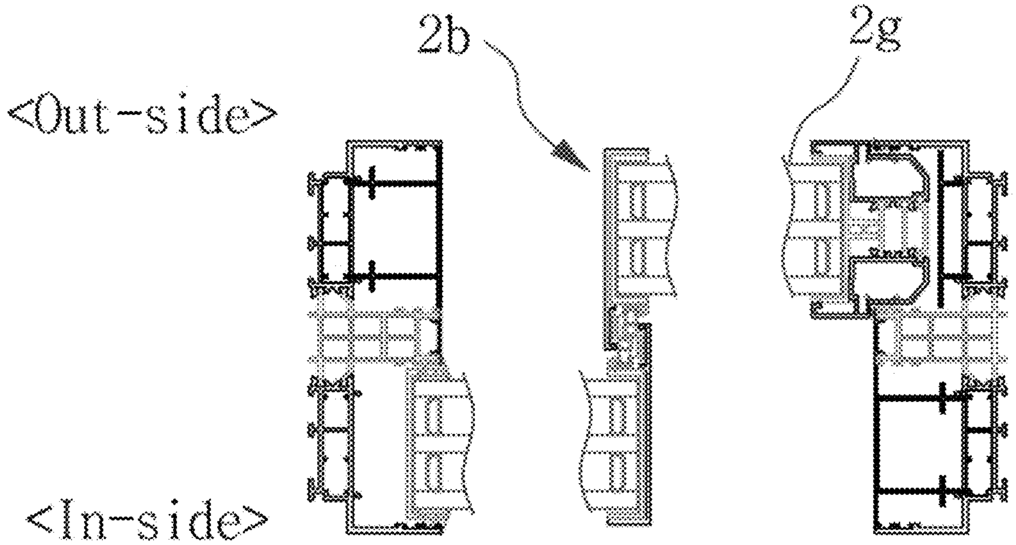
Figure 5A:
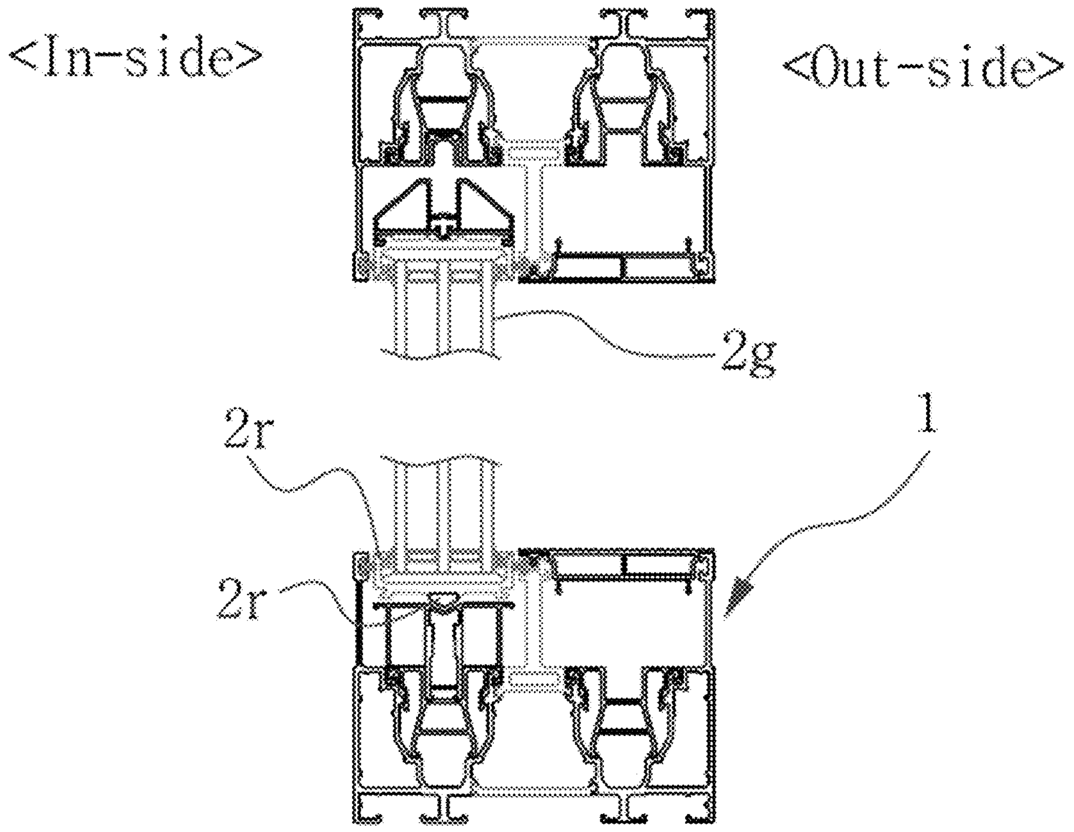
FIGS. 5*a* to 5*c* are views showing additional example for two-side supporting frame window type.
Figure 5B:
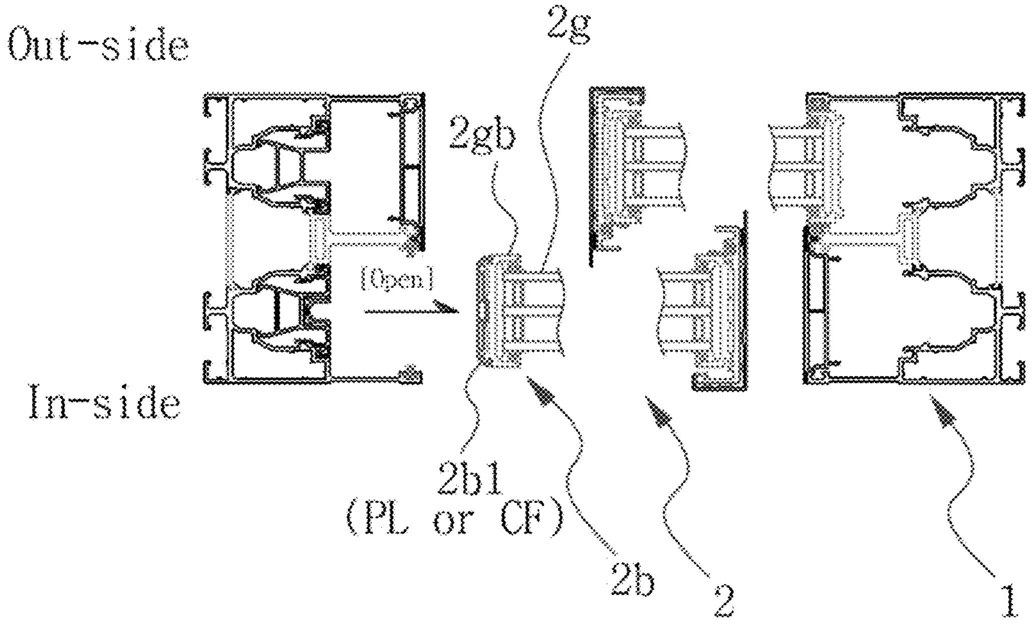
Figure 5C:
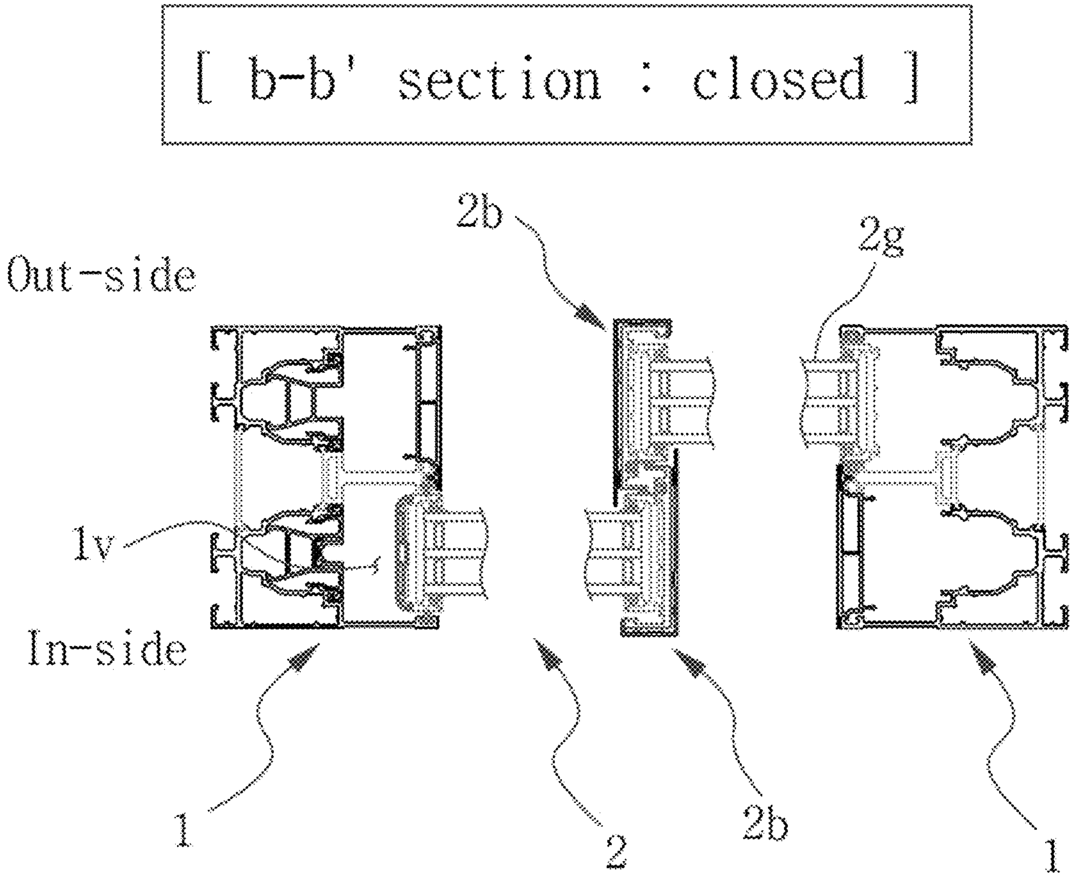
Figure 6A:
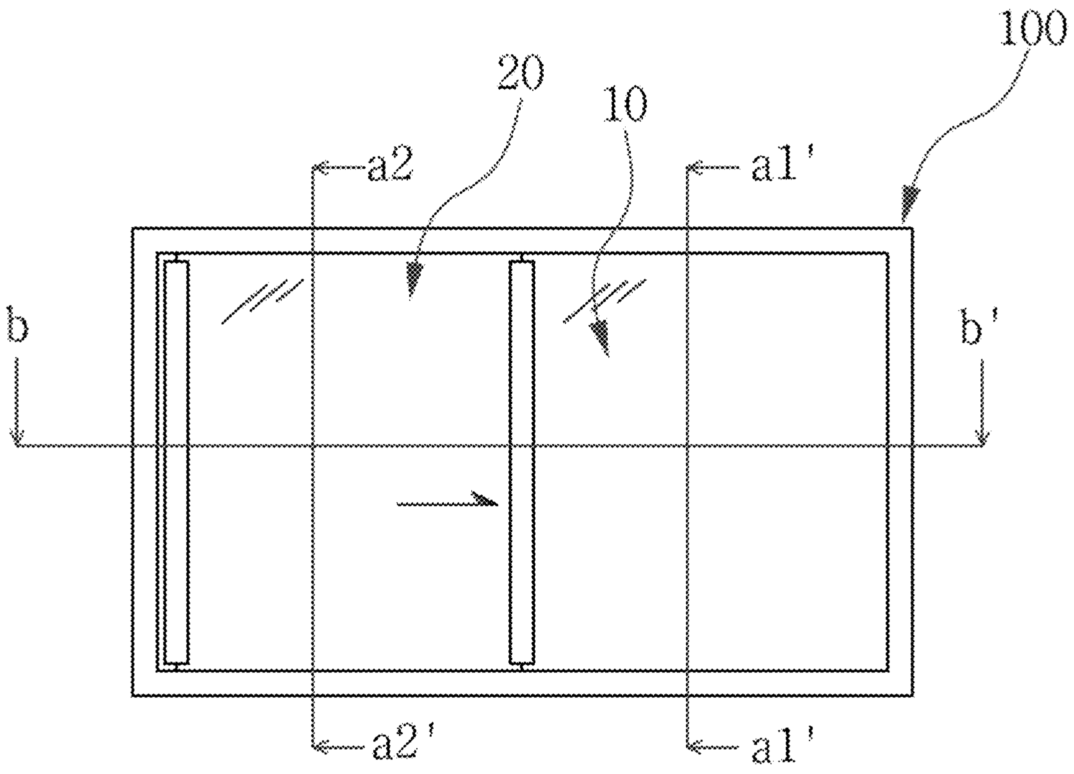
FIGS. 6*a* to 6*d* are views illustrating the side insulation structure of the door frame in the side section where the two-side supporting frame window chassis and the door frame are overlapping on each other in the sliding window according to the first embodiment, which is a preferred embodiment according to the present invention.
Figure 6B:
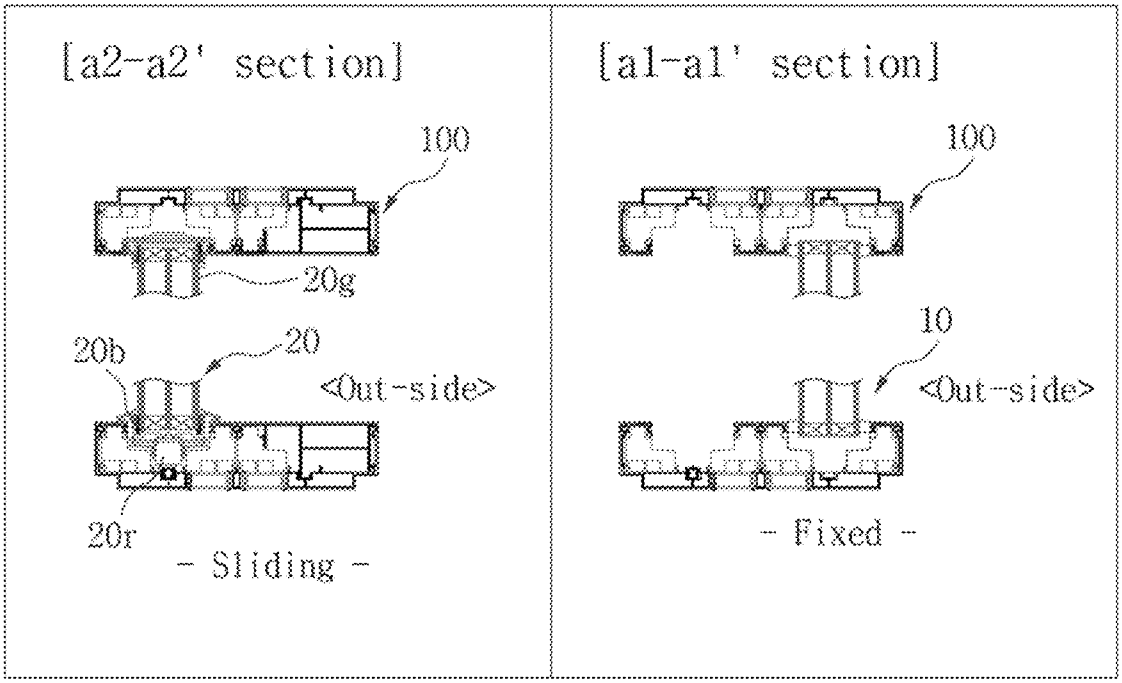
Figure 6C:
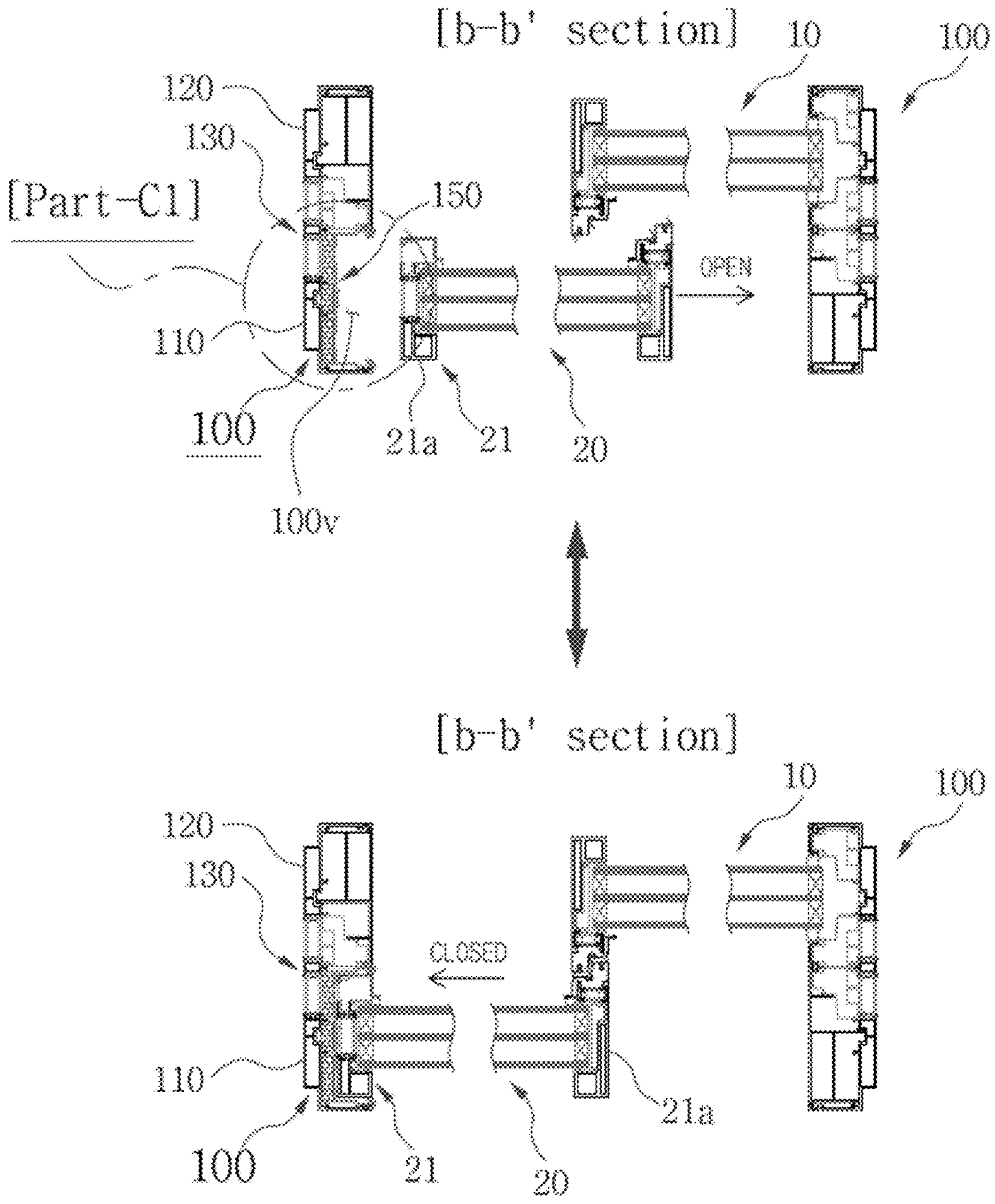

As described above, in the sliding window improved to increase the openness of the windows, the present invention provides a new thermal insulation structure in a side section in which a door frame and a two-side supporting frame window chassis having a relatively narrow frame width compared to a four-side supporting window chassis are overlapping on each other. According to a preferred embodiment of the present invention illustrated through the drawings shown in the accompanying drawings FIGS. 6*a* to 6*d*, when a sliding window 20 is closed in a two-side supporting frame window type sliding window system that supports only both sides of the glass window constituting the sliding window, a side chassis part 21 of the two-side supporting frame window chassis and the door frame 100 in an insulating structure in the side section are overlapping on each other, wherein the insulating structure, as shown in FIGS. 6*a* and 6*b*, provide a supporting structure in which a roller 20*r* is directly coupled to a lower glass supporting insulation bracket 20*b* made of a flexible material without an aluminum chassis under the glass panel 20*g* so that the roller 20*r* slides along a guide rail on the door frame 100, and wherein the insulating structure provide a foamed insert member for blocking thermal bridge 150 in an insertion pocket 100*v* of the door frame 100 into which the side cap 21*a* made of aluminum of the side chassis portion 21 of the sliding window 20 is inserted when a sliding window 20 comprising a glass support insulation bracket 20*b* attached to the side of the glass panel 20*g*; and a side chassis portion 21 having a side cap 21*a* made of an aluminum material provided to support the glass support insulation bracket 20*b* from the inner and outer surfaces, is sliding and is closing into a door frame 100 (see FIG. 6*c*), wherein the foamed insert member for blocking thermal bridge 150 is fixedly installed in a longitudinal direction on an inner part 110 of the door frame 100 with filling a gap space between the inner part 110 of the door frame 100 and the side cap 21*a* made of an aluminum material of the side chassis portion 21 of the sliding window 20, and wherein a rubber gasket 154 is additionally installed in a longitudinal direction on an outer surface of the foamed insert member for blocking thermal bridge 150 in order to provide airtightness between the side caps 21*a* made of aluminum and the foamed insert member for blocking thermal bridge 150.

Here, it is preferable for the foamed insert member for blocking thermal bridge 150 to be formed to have '⊂' shape (a channel shape with one inner side open) that can fill all of a front surface, a side surface, and a back surface of the insertion pocket 100*v* of the door frame 100.

Figure 6D:
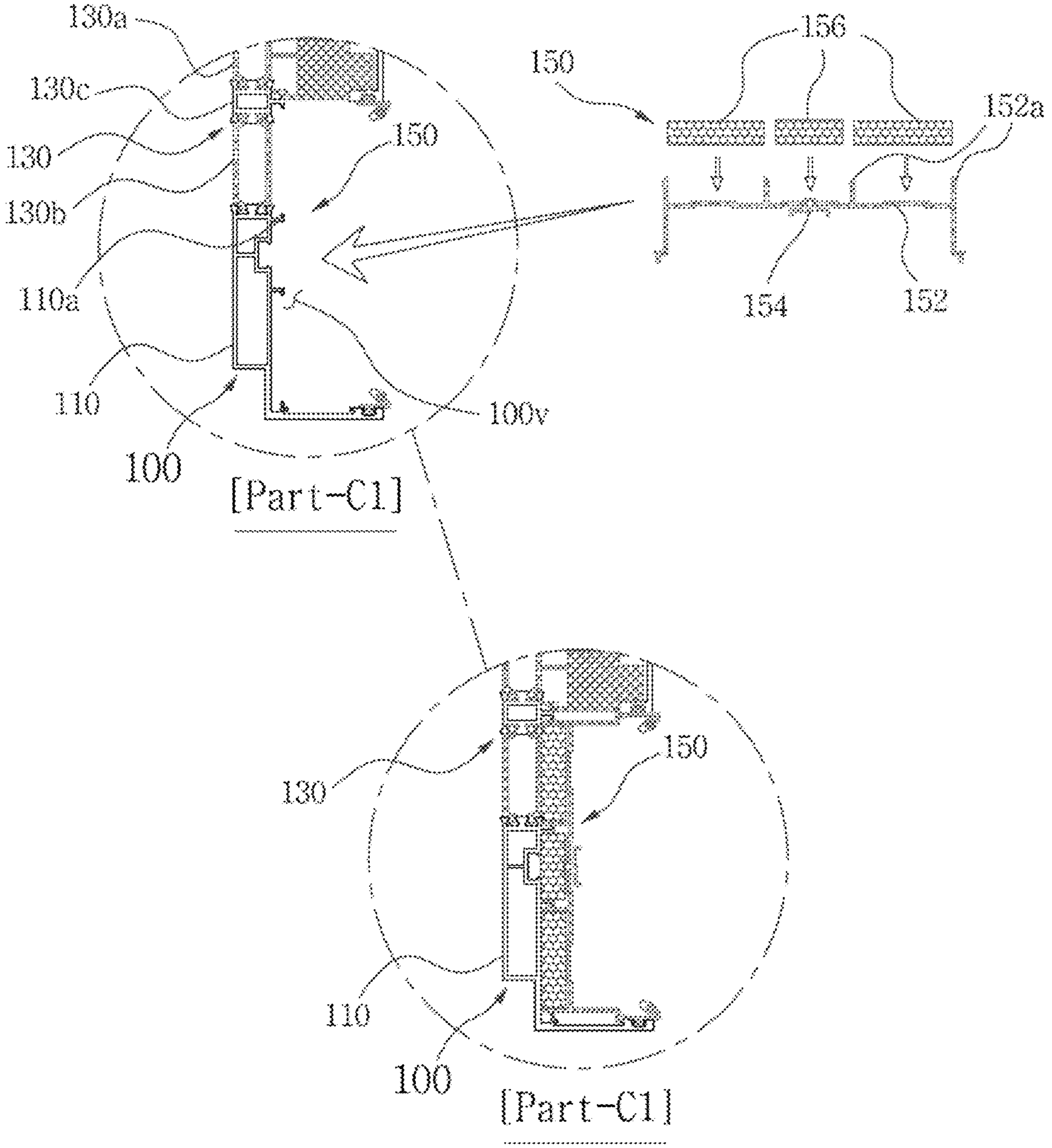

In addition, as shown enlarged as [Part-C1] in FIG. 6*d*, the foamed insert member for blocking thermal bridge 150 according to the first embodiment of the present invention is made of a composite material. That is, an assembly of the composite material provided by attaching foam rubber 156 or foamed Styrofoam™ (foamed styrene resin, expanded polystyrene), which has excellent thermal insulation properties but relatively low ability to maintain shape and durability, to a thin synthetic resin plate 152 having relatively low thermal insulation performance but high ability to maintain shape and durability (as illustrated in FIG. 6*d*) is installed in the insertion pocket 100*v* of the door frame 100 in the shape of the '⊂' shape (the channel shape with one inner side open) and on an outer surface of the insertion pocket 100*v* of the thin synthetic resin plate 152, that is, toward an inner side 110 of the door frame 100, as a square-shaped foam material, foam rubber 156, or foamed Styrofoam™ (foamed styrene resin, expanded polystyrene) is inserted.

Figure 7:
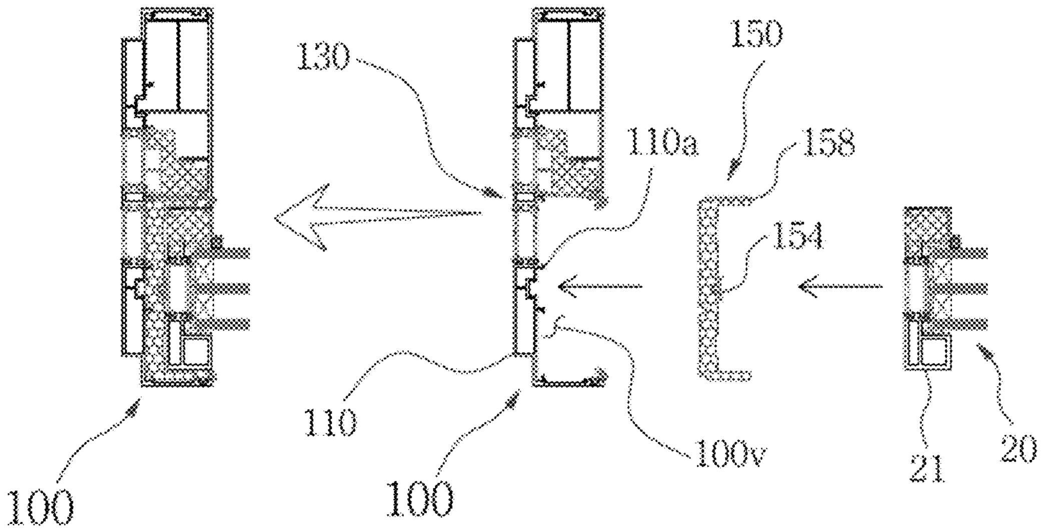
FIG. 7 is a diagram showing the configuration of a modified embodiment of the first embodiment as an additional embodiment according to the present invention.

On the other hand, according to the second embodiment of the present invention additionally shown in FIG. 7, the foamed insert member for blocking thermal bridge 150 may be formed by integrally molding a foamed plastic-based heat insulating material 158 that can have both appropriate heat insulation properties and shape retention properties (ability to maintain shape).

Preferably, fitting protrusions 110*a* and 152*a* or fitting grooves for mutual fitting coupling are provided between the foamed insert member for blocking thermal bridge 150 and the inner side 110 of the door frame 100.

And, the foam rubber 156 (foam rubber) insulator having a closed-cell structure enlarged as [Part-C1] in FIG. 6*d* has excellent moisture-proofing properties, so even time elapses after construction, thermal conductivity maintains lower than that of other insulators and relatively stable status, therefore it has the advantage of long-lasting insulation retention.

In addition, the foamed plastic-based heat insulating material 158 shown in FIG. 7 may be a thermal insulation material made by foaming a plastic resin with a foaming agent, and has a lower thermal insulation property compared to a foam rubber 156, but is useful as a building material requiring weather resistance since it can be maintained as a single shape. Representative examples for the foamed plastic-based heat insulating material 158 include extruded expanded polystyrene, rigid urethane foam, polyethylene foam, expanded PVC, and expanded polyurethane, etc. The thermal conductivity may be in the range of about 0.020 to 0.1 kcal/mh° C. at an average temperature of 20° C.

Figure 8A:
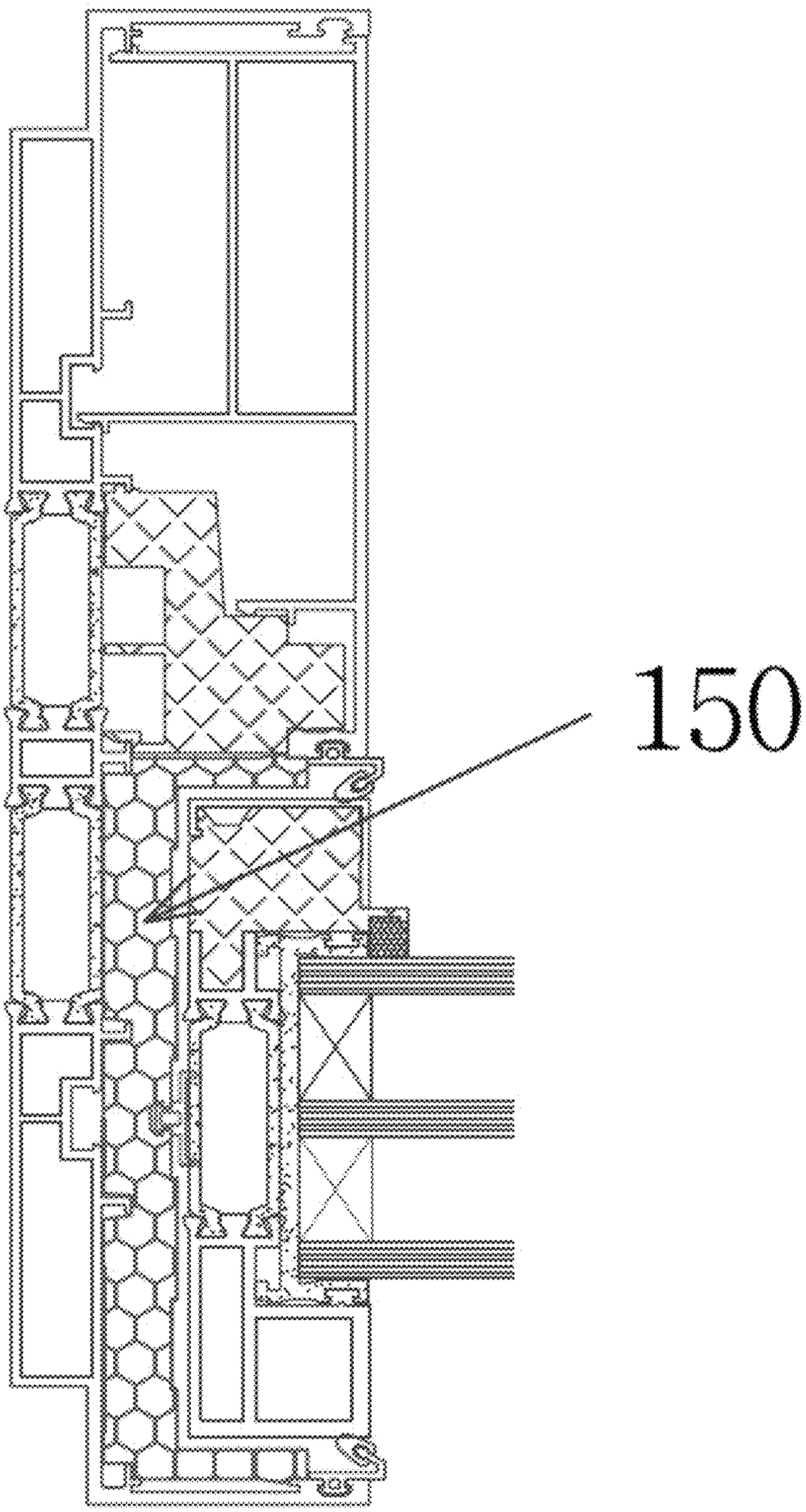
FIG. 8*a* is a diagram showing a simulation model for the configuration of a preferred embodiment according to the present invention.
Figure 8B:
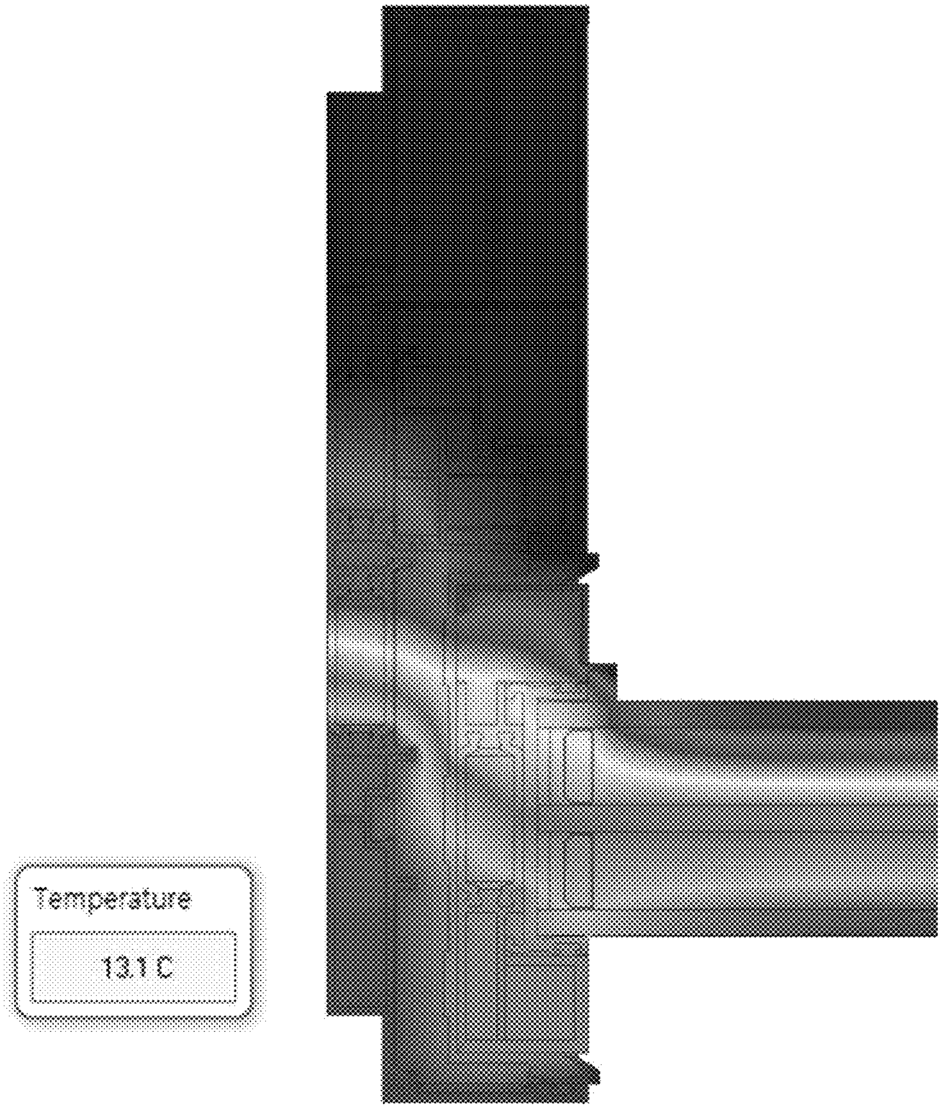
FIG. 8*b* is a diagram showing a simulation result using the same.

A numerical analysis model (outside temperature −18° C., room temperature 21° C.: temperature difference ΔT=39° C.) is designed to simulate the temperature of the window system configuration according to the embodiment of the present invention configured as above (that state in which the insertion pocket 110*v* is filled with the foamed insert member for blocking thermal bridge 150). As a result of the numerical analysis test, as shown in the accompanying drawings FIGS. 8*a* and 8*h*, it is possible to maintain a high temperature of 13.1° C. at the reference point of the inner part 110 of the door frame 100, thereby exhibiting high energy efficiency. Furthermore, the effect of preventing dew condensation was achieved.

Figure 9A:
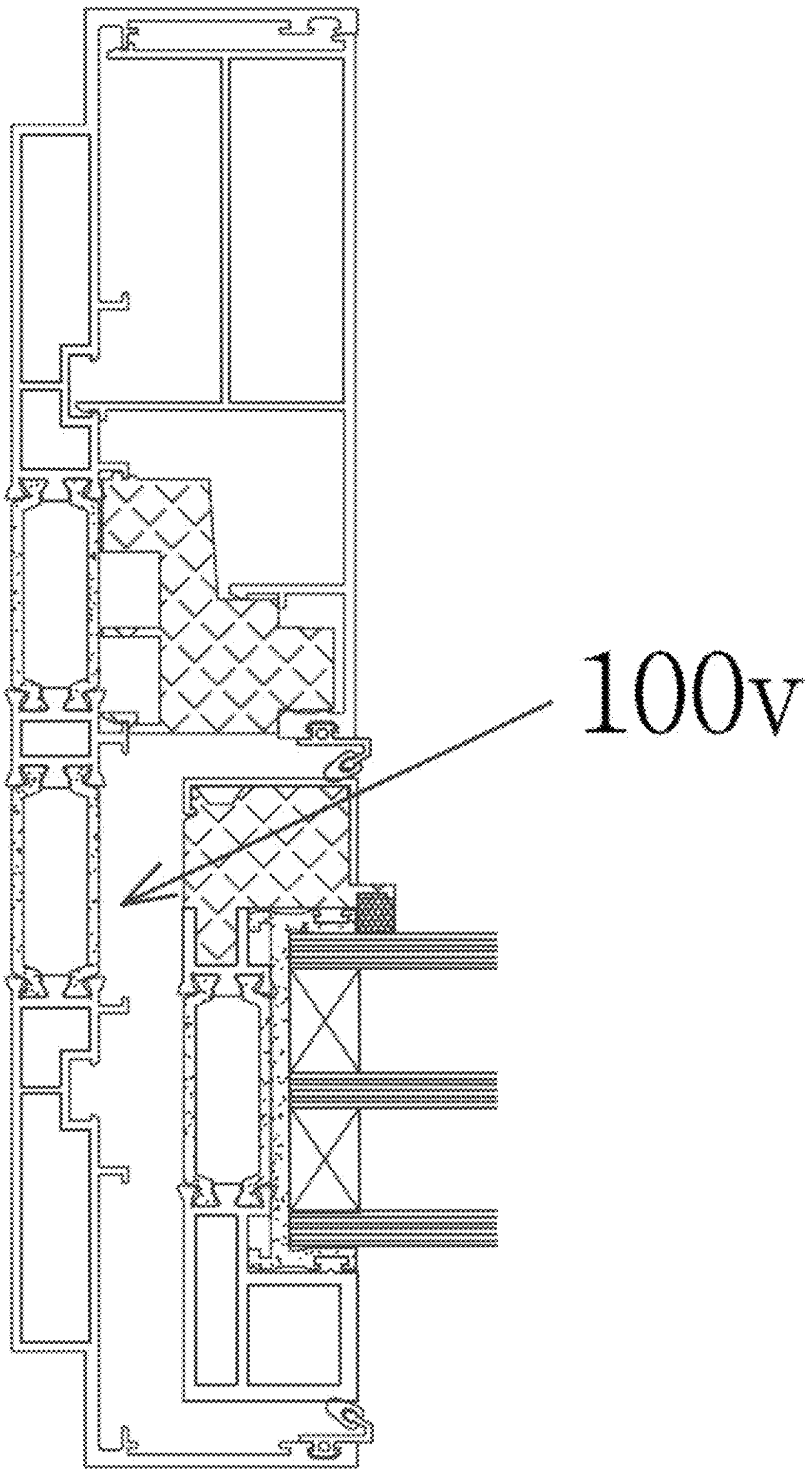
FIG. 9*a* is a diagram illustrating a thermal insulation effect simulation model for a comparative example compared with a configuration of a preferred embodiment according to the present invention.
Figure 9B:
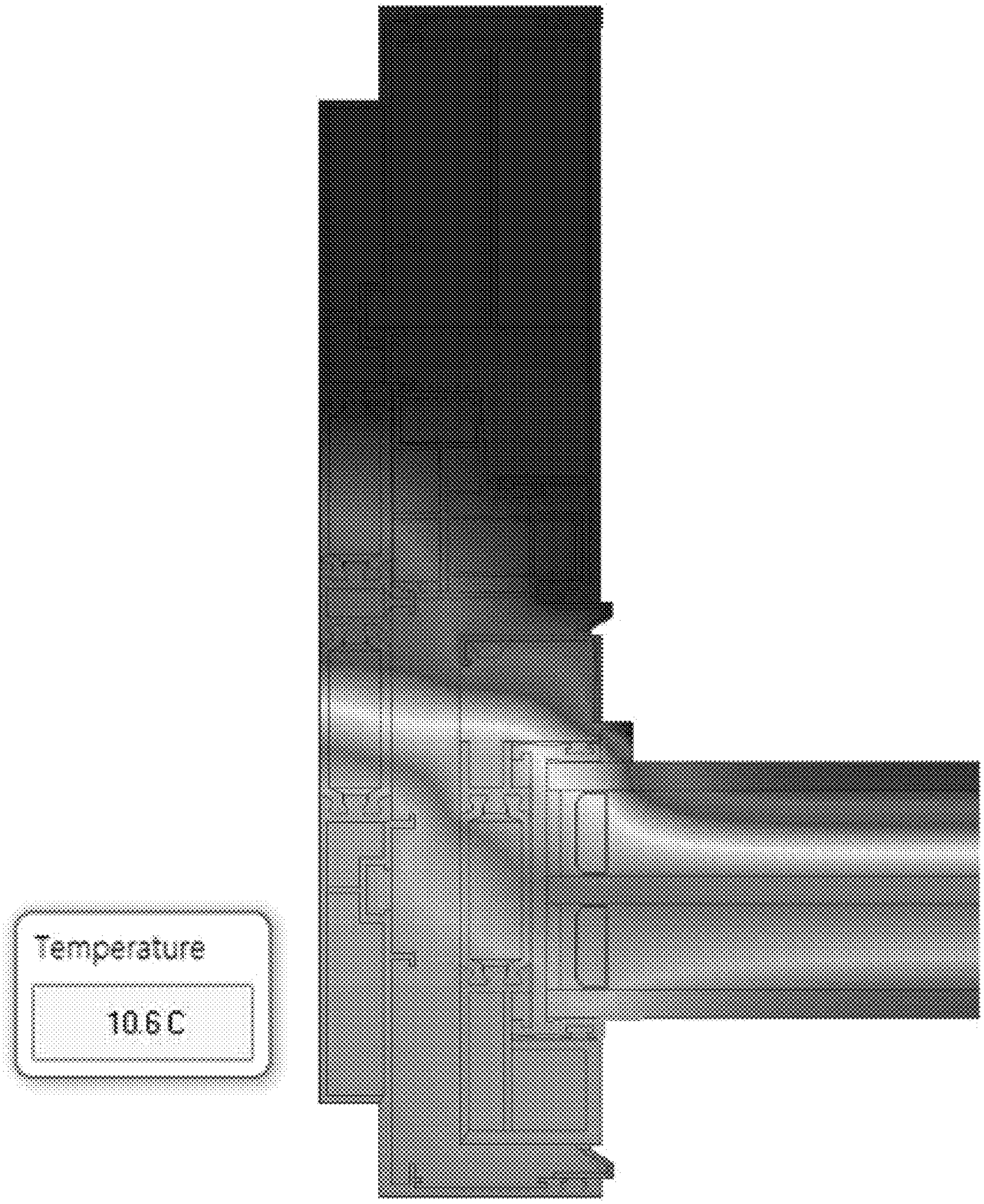
FIG. 9*b* is a diagram illustrating a result of a thermal insulation effect simulation using the same.

And, as shown in the accompanying drawing FIG. 9*a*, in another comparative example (the comparative state in which the insertion pocket 110*v* is filled with only air without foamed insert member for blocking thermal bridge), surface temperature of 10.6° C. appears at the reference point of the inner side 110 of the frame 100. As a result, with being compared with the embodiment of the present invention, it was found that a temperature drop of 2.5° C. appeared.

In the above, while describing in detail a preferred embodiment of the present invention is applied to window having a pair of glass in which a plurality of glass panels 20*g* are formed by overlapping each other by bonding with a predetermined interval and a sealing member there between to realize a vacuum in the gap. However, it should be understood that the terms of glass panels are not to be constructed as limiting the scope of the present invention, and various modifications and improvements by those skilled in the art using the basic concept of the present invention defined in the following claims are also within the scope of the present invention.

The invention claimed is:

1. An insulating structure in which a side chassis part portion (21) of a two-side supporting frame window chassis and a door frame (100) in a side section are overlapping on each other, when a sliding window (20) is closed in sliding window system having a two-side supporting frame that supports only both sides of the glass window constituting the sliding window, wherein the insulating structure includes a supporting structure in which a roller (20*r*) is directly coupled to a glass support insulation bracket (20*b*) made of a flexible material without an aluminum chassis under a glass panel (20*g*) so that the roller (20*r*) slides along a guide rail on the door frame (100), and wherein the insulating structure includes a foamed insert member for blocking a thermal bridge (150) in an insertion pocket (100*v*) of the door frame (100) into which a side cap (21*a*) made of aluminum of the side chassis portion (21) of the sliding window (20) is inserted when the sliding window (20) comprising the glass support insulation bracket (20*b*) is attached to the side of the glass panel (20*g*); and the side chassis portion (21) having includes the side cap (21*a*) made of an aluminum material provided to support the glass support insulation bracket (20*b*) from an inner surface and an outer surface, is sliding and is closing into the door frame (100), wherein the foamed insert member for blocking the thermal bridge (150) is fixedly installed in a longitudinal direction on an inner part (110) of the door frame (100) and fills a gap space between the inner part (110) of the door frame (100) and the side cap (21*a*) made of an aluminum material of the side chassis portion (21) of the sliding window (20), wherein a rubber gasket (154) is installed in a longitudinal direction on an outer surface of the foamed insert member for blocking the thermal bridge (150) in order to provide airtightness between the side caps (21*a*) made of aluminum and the foamed insert member for blocking thermal bridge (150), wherein the foamed insert member for blocking the thermal bridge (150) is made of a composite material, and wherein an assembly of the composite material includes attaching foam rubber (156) or foamed styrene resin, to a synthetic resin plate (152) to maintain shape and durability.

2. The insulating structure according to claim 1, wherein fitting protrusions (110*a*) and (152*a*) or fitting grooves for mutual coupling are disposed between the foamed insert member for blocking the thermal bridge (150) and the inner part (110) of the door frame (100).

3. The insulating structure according to claim 1, wherein the foamed insert member for blocking the thermal bridge (150) is shaped to fill all of a front surface, a side surface, and a back surface of the insertion pocket (100*v*) of the door frame (100).

4. The insulating structure according to claim 1, wherein the fitting protrusions (110*a*) and (152*a*) or fitting grooves for mutual coupling are disposed between the foamed insert member for blocking the thermal bridge (150) and the inner part side (110) of the door frame (100).

* * * * *